March 31, 1959
S. J. POPEIL
2,879,617
METHOD FOR MANUFACTURING ARTIFICIAL FOLIAGE, PLANT LIFE, AND SIMILAR SHAPES
Filed Dec. 14, 1954
2 Sheets-Sheet 1
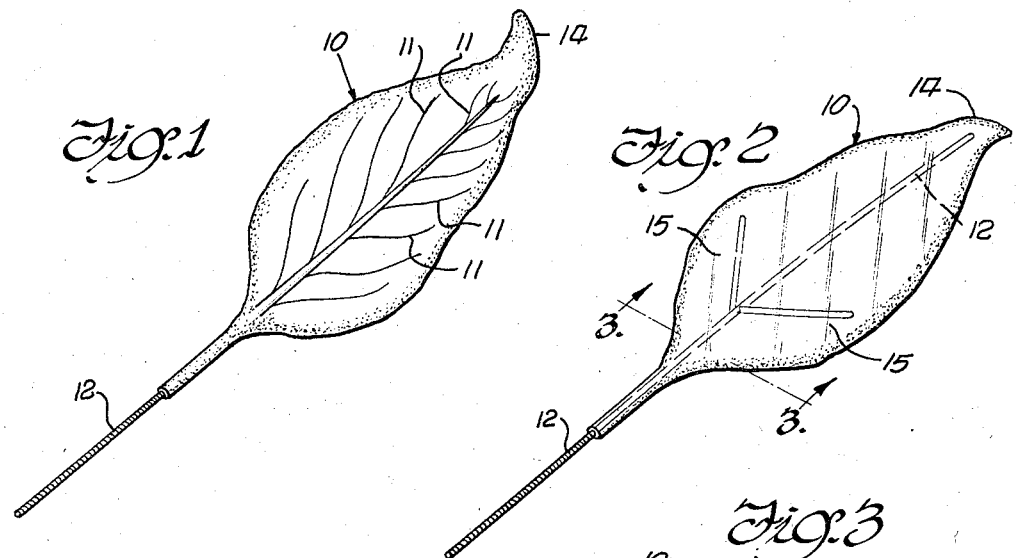
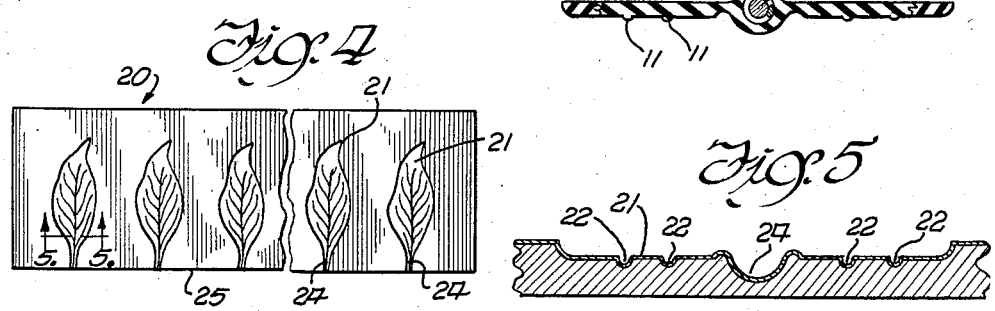
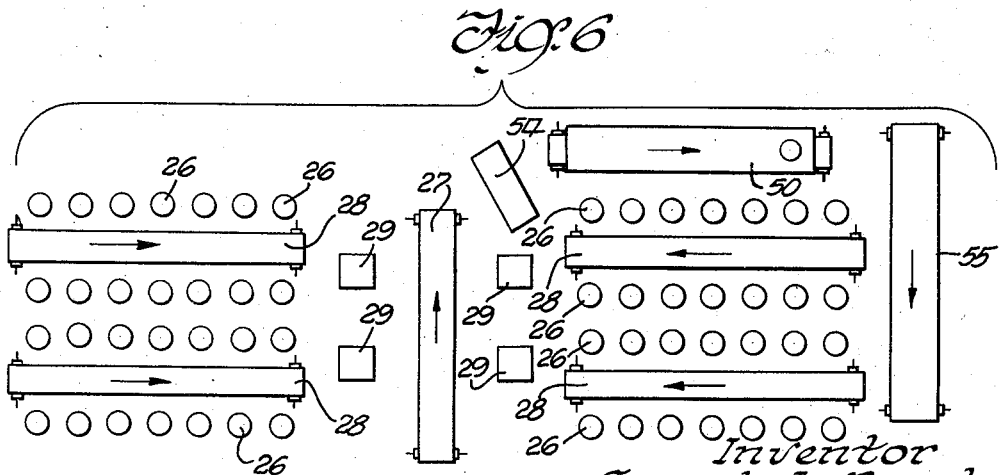
Inventor
Samuel J. Popeil
by Jack E. Dominik
Attorney March 31, 1959 S. J. POPEIL 2,879,617
METHOD FOR MANUFACTURING ARTIFICIAL FOLIAGE, PLANT
LIFE, AND SIMILAR SHAPES
Filed Dec. 14, 1954 2 Sheets-Sheet 2

Inventor
Samuel J. Popeil
by Jack Dominik
Attorney

United States Patent Office 2,879,617
Patented Mar. 31, 1959

2,879,617

METHOD FOR MANUFACTURING ARTIFICIAL FOLIAGE, PLANT LIFE, AND SIMILAR SHAPES

Samuel J. Popeil, Chicago, Ill.

Application December 14, 1954, Serial No. 475,176

3 Claims. (Cl. 41—13)

The present invention relates to a method for manufacturing artificial leaves, flowers, plants and similar shapes from a heat cured liquid plastic. In particular the invention may be profitably employed in manufacturing multicolored artificial leaves and flower petals from a heat cured vinyl and cloth wraped wire stem.

The practice of making artificial flowers and plants is not new. By the same token, the methods of manufacturing such artificial products are also old. Generally the methods employed involve a considerable degree of labor cost, artistic choice, and skilled handiwork. Attempts at increasing output to meet expanding markets are often beset by a shortage of labor skilled to the handicraft demanded.

The advent of a wide variety of new plastics has brought a corresponding variety to many household items for utility as well as decor. But the application of plastics to the manufacture of artificial plants, foliage, and similar shapes has lagged.

With the foregoing in mind, it is the general object of the present invention to teach a method of manufacturing artificial plants and foliage on a large scale with the use of semi-skilled and unskilled help. A related object of the invention is to provide a method for manufacturing plastic leaves and petals which closely simulate natural plant life, and yet may be inexpensively produced.

Another object of the invention is to furnish the manufacturer with a method for manufacturing artificial plastic foliage and flowers which can be made by unskilled help in an infinite variety of colors, tones, and shades.

Still another object of the invention is to provide a method of manufacturing plastic foliage on a large scale which requires a minimum of skilled supervisory help.

Yet another object of the present invention is to provide a method for manufacturing plastic foliage which achieves the foregoing objectives while insuring a high quality product with a minimum of rejects.

Further objects and advantages of the present invention will become apparent as the following description proceeds taken in conjunction with the illustrative drawings in which:

Figure 1 is a perspective view of a typical plastic leaf made in accordance with the method of the present invention.

Fig. 2 is a view of the reverse side of the leaf shown in Fig. 1.

Fig. 3 is a partial cross-section of the leaf shown in Fig. 2 taken along section 3—3.

Fig. 4 is a plan view of a typical production mold used to produce the leaf illustrated in Figs. 1 and 2.

Fig. 5 is a partial section of the leaf mold illustrated in Fig. 4 taken along section line 5—5 shown in Fig. 4.

Fig. 6 is a schematic flow diagram of a manufacturing layout for fabricating plastic leaves and similar shapes.

Figure 7:
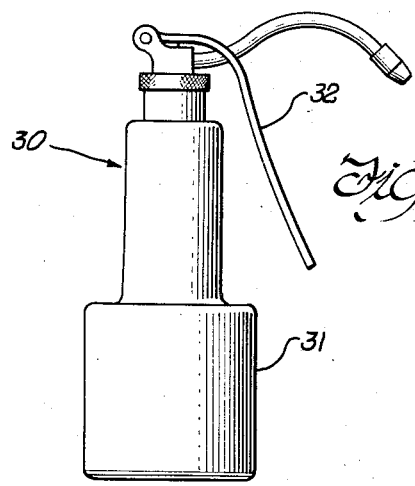
Fig. 7 is a front elevational view of a plastic dispensing gun used in the manufacture of plastic leaves.

The present invention, as stated above, has to do with a method for making artificial foilage, such as leaves, and similar items, out of plastic. Although a wide variety of heat curing liquid pigmented plastics may be employed, excellent results have been achieved using a material known as "Plastisol," a vinyl base pigmented liquid. A typical plastic leaf 10 such as may be manufactured according to the invention is illustrated in Figure 1.

Numerous defects may arise in using the pigmented plastic materials for artificial foliage. One of the most difficult problems is to retain a fidelity of color and an absence of discoloration due to the materials used in molding, stemming, heat treating, and coloring. To reduce the possibility of discoloration, the molds employed by the preferable method are prepared in a unique manner.

A typical mold 20 used in making a plastic leaf 10 is shown in Fig. 4. It will be seen that the mold 20 contains a plurality of leaf shape cavities 21. Within the cavity 21, as shown in Fig. 5, a plurality of vein troughs 22 are provided to form the vein lines 11 such as shown in the leaf 10 in Fig. 1. In addition a stem trough 24 is provided to receive the stems 12 of the leaf 10.

The molds 20 are first prepared by matching male and female dies (not shown) presenting the external or upper pattern desired in the leaf or petal to be simulated. The female die is positioned on a punch press bed. Thereafter the male die is placed in a punch press and an aluminum sheet which is to be used as a production mold 20 is stamped with a plurality of impressions 21 from the male die on the punch press. For best results the impressions are so arranged that the stem trough 24 extends downwardly and over the bottom edge 25 of the long base of the mold. It has also been found that a sheet of aluminum of about 40/1000 inch thick is best for preparing the molds 20.

To insure the plastic against discoloration from reactive metal surfaces of the mold, to harden the surface of the mold to prevent scratching which would distort the delicate patterns imparted to the artificial leaves and petals, and to urge a maximum heat absorption by the molds to accelerate and uniformly distribute the curing heat, the aluminum production molds 20 are black anodized.

It has been found that painting the inoperative surfaces of the aluminum molds black will suffice to impart satisfactory heat absorbing properties to the mold. Also silver or other color anodizing will harden the mold sufficiently. Using aluminum rather than other metals with a vinyl plastic does reduce contamination of the plastic during the curing cycle. Black anodizing the aluminum molds 20 has resulted in achieving all of these advantages in a process which is less expensive and far more beneficial than any combination of the others.

Because the anodizing process involves the application of chemicals on the surfaces of the molds 20 which have a harmful effect on various plastics when baked, and also because a certain residual porosity exists in the face of the molds, it is important that the molds be first preheated before initial use for a period of time sufficient to bring them to the curing temperature of the plastic. In the case of certain applications, it may be necessary to wash the molds and repeat the heating cycle to the curing temperature of the plastic at least once in order to reduce the possibility of injurious effects to the face of the finished product.

After the molds 20 have been prepared and black anodized and heat treated, they are placed at various work stations 26 where semi- and unskilled personnel fill the female recesses 21 of the aluminum molds 20 with the liquid plastic. In order to most effectively fill the molds, a special squirt gun 30 (see Fig. 7) has been developed for this process. The gun contemplates a fluid reservoir 31 and an elongated lever 32 operated immersed pump which ejects the contained liquid plastic through an orifice in the discharge tube nozzle 34. It is important that the tip 35 of the squirt gun nozzle 34 be of a material softer than the surface of the anodized aluminum mold. Otherwise scratching of the delicate mold surface will result after repeated operation, and consequently give rise to a source of imperfections in the final product.

Figure 8:
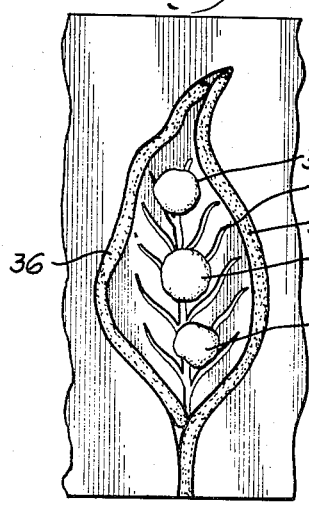
Fig. 8 is a view of a single leaf mold recess in enlarged scale showing the initial step of applying plastic to the mold.
Figure 9:
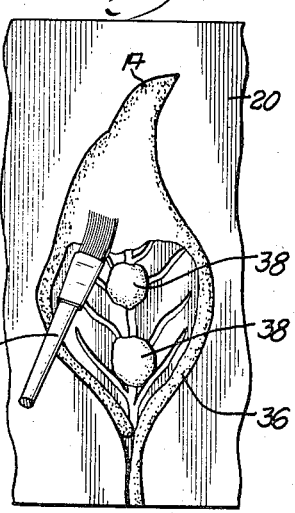
Fig. 9 is a diagrammatic showing of the method of spreading the plastic within the leaf mold subsequent to the preparation shown in Fig. 8.
Figure 10:
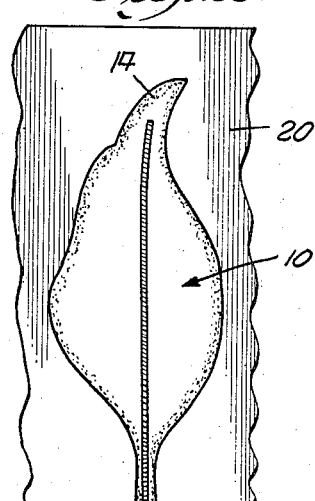
Fig. 10 shows the leaf mold with inserted stem prior to entering the curing oven.

The technique of placing the liquid plastic in the aluminum molds is also important to a completed satisfactory product with a minimum of labor time. Figures 8 and 9 illustrate how the plastic is filled into the cavities 31. By using the squirt gun 30 a peripheral border 36 is ejected in each of the mold recesses 21. Various colors may be injected from separate squirt guns 30 if desired in the particular application.

Then the gun is employed, or perhaps a different gun with even another color, to place one or more large deposits of liquid plastic 38 in the center of the mold. Thereafter the operator utilizes a small hand brush 39 with a convenient width of heavy bristle to spread the liquid plastic in an even thin coating over the surface of the mold. Because the surface of the mold is black anodized, the operator may gauge the proper thickness of the liquid pigmented plastic applied over the mold as that thickness required to satisfactorily obscure the black base of the mold.

Should it be desired to introduce a speckled finish on the plastic leaves or petals, a unique method is available to achieve this result. The molds 20 are sent to a separate station where the operator uses a metal bristled brush to daub the speckling into the mold recess 21. The molds are then pre-heated to a temperature sufficient to set the speckled portion, and then the recesses 21 are filled as outlined above.

After the mold cavities 21 and stem troughs 24 have been filled with the liquid plastic, the molds are placed on an endless belt 28 which delivers them to the stemming station 29. The stems 12, which are inserted into the leaves 10, are cotton-wrapped wires. It has been found that the cotton wrapping of the stems will absorb sufficient moisture from the air to react unfavorably with the liquid plastic in curing. Bubbling is induced in the leaves as a diminution in the effect of the bond between the leaf and the stem.

Figure 11:
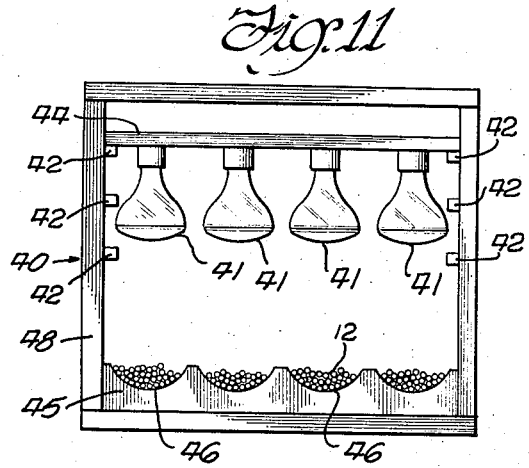
Fig. 11 is a front elevational view of a stem drying station.

In order to properly prepare the stems for insertion into the plastic filled molds, a drying chamber 40, such as illustrated in Fig. 11, has been provided at the stemming station. The drying chamber illustrated contemplates a battery of heating elements, 41, shown here as 250 watt heat lamps, adjustable to a height range from 2–8″ from the bottom of the stem rack 45. The height adjustability is achieved by installing parallel slides 42 which are selectively engaged by the mounting base 44 of the heat elements 41.

It will be noted that the stem rack 45 comprises a plurality of troughs 46 achieved by corrugating a sheet of aluminum. The stem rack 45 is proportioned to nest within the heat station frame 48. The various sizes, colors, and weights of stems are separated within the stem rack troughs. Because the stems are hand-inserted into the molds, the use of a large oven or heating unit where the temperature becomes too great is inadvisable.

When the production facilities are shut down overnight, the stems will pick up moisture from the air. In order to minimize the possibility of deleterious effects from this collection of moisture, the heat unit should be activated at least fifteen minutes to one half hour prior to beginning manufacture when the line is reopened.

The stems 12 are inserted into the leaf mold and normally extend to a point adjacent the tip 14 of the leaf mold. (See Fig. 2.) Slight variations from this position may be employed, but to adequately insure a shape which will persist, it is recommended to extend the stems as far as possible toward the leaf tip 14. In addition, it is desirable in broad leaf patterns to add reinforcing veins 15 diverging from the main stem 12 within the body of the leaf 10.

After the stems have been inserted in the aluminum molds they are placed on the conveyor 28 which delivers them to the oven rack. The oven rack 54 (not illustrated in detail) is a large vertical rack containing a plurality of closely spaced shelves through which access on both sides may be had to the prepared molds. The molds are then taken from the oven rack 54 and placed in the curing oven 50.

Figure 12:
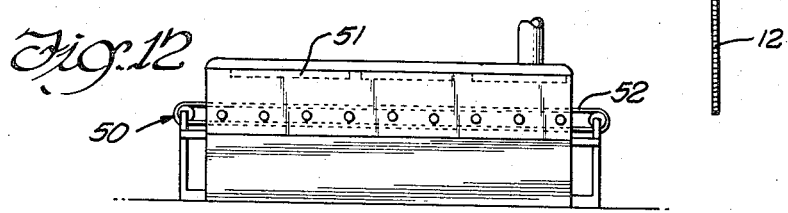
Fig. 12 is a front elevational view of the curing oven showing its internal features in phantom lines.

The curing oven 50 (shown in Fig. 12) comprises two essential elements, the heating elements 51, and a conveyor belt 52. The conveyor belt 52 found most satisfactory for the present application is approximately 12′ long and 2′ wide and made of a chain linked material. The heating elements are a series of resistance bars of chrome-Nichrome which are so induced by current to raise the heat of the molds to 350° (in the case of the Plastisol vinyl base material) by the time they leave the curing oven.

Control of temperature and speed of the belt are the only critical factors in the operation of the oven. The heating elements cannot be so hot as to scorch the material. A temperature voltage relationship may be established between the speed of the chain belt and the heat in the heating elements. Although a plurality of chrome-Nichrome bars have been found very satisfactory for the heating elements, a plurality of infra-red or heat lamps in a battery could be employed.

After the molds leave the curing oven the cured plastic leaves or petals are visually inspected for air bubbles which indicate overcuring. If such are found, the speed of the belt may be increased or the power consumption of the heating elements decreased.

Figure 13:
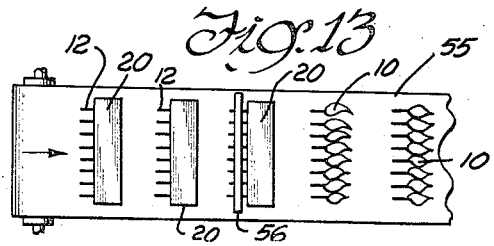
Fig. 13 is a top view of the stripper conveyor belt illustrating stripping the leaves from the molds.

From the visual inspection station the molds are placed on the stripper belt 55 with the plastic portion of the leaves or petals facing downwardly. (See Fig. 13.) The leaves are stripped from the molds by the stripper block 56 which engages the extending stems, and then the molds are flipped upwardly with a twisting motion to peel the plastic leaves 10 from the molds 20.

Subsequently the stripped leaves are twisted manually in order to impart a lifelike appearance to the finished product as well as to test the plastic for a proper cure. It is important to twist the leaves while they are still hot and not fully cured so that a permanent set will be effected. At this time the flash may be trimmed from the edges of the leaves or petals.

The combination of the unique features of the present method for manufacturing plastic leaves, foliage and like shapes will be more fully appreciated as the flow diagram of manufacture illustrated in Fig. 6 is reviewed. The molds 20 are filled with the plastic at the several work stations 26 by unskilled labor. After the molds are filled they are placed on the conveyors 28 where they move centrally to the stemming stations 29. After the preheated stems 12 are inserted into the molds 20, the molds then move along the oven conveyor 27 to the oven rack 54. The oven rack 54 serves to take up increases and decreases in the speed of the production line, and conveniently store the molds prior to their placement in the curing oven 50. When the molds are removed from the curing oven 50 they are then placed on the stripper conveyor belt 55 where they are stripped with a stripper block 56, twisted, and trimmed of flash.

Although the particular embodiment of the present invention has been shown and described in some detail here, there is no intention to thereby limit the invention to the details of such embodiment. On the contrary, the intention is to cover all modifications, alternative embodiments, and usages or equivalents of the method for manufacturing artificial foliage and plant life as fall within the spirit and scope of the invention as expressed and defined in the specification and the appended claims.

I claim as my invention:

1. In the method of manufacturing artificial plastic foliage in an aluminum sheet mold having a plurality of female recesses defining a leaf pattern including a stem recess extending to the edge of the aluminum sheet, the steps comprising, extruding liquid uncured plastic into the mold female recess from a nozzle, said nozzle being formed from a material softer than the aluminum mold to prevent scratching, the plastic being applied in a continuous band around the border of the mold and in a central deposit in the middle of the mold, thereafter brushing the plastic into an even pattern covering the female recesses of the mold including the stem portion, pre-heating fibre wrapped stems to drive substantially all of the moisture from the fibre portion, thereafter laying the stem along the long axis of the female recess in the uncured plastic so that the stem extends to a point adjacent one end of the leaf beyond the stem recess at its other end, heating the plastic to its curing temperature in a conveyor type oven, stripping the molded products from the mold immediately after leaving the curing oven by grasping the stems, and manually twisting the plastic portions of each molded item immediately after stripping and before cooling to impart a life-like varied curved appearance to each item.

2. In the method of manufacturing artificial plastic foliage in an aluminum sheet mold having a plurality of female recesses defining a leaf pattern including a stem recess extending to the edge of the aluminum sheet, the steps comprising, black anodizing the aluminum mold, pre-heating the anodized mold, allowing the mold to cool to room temperature, extruding liquid uncured plastic into the mold female recess from a nozzle, said nozzle being formed from a material softer than the aluminum mold to prevent scratching, the plastic being applied in a continuous band around the border of the mold and in a central deposit in the middle of the mold, thereafter brushing the plastic into an even pattern covering the female recesses of the mold including the stem portion, pre-heating fibre wrapped stems to drive substantially all of the moisture from the fibre portion, thereafter laying the stem along the long axis of the female recess in the uncured plastic so that the stem extends to a point adjacent one end of the leaf and beyond the stem recess at its other end, heating the plastic to its curing temperature in a conveyor type oven, stripping the molded products from the mold immediately after leaving the curing oven by grasping the stems, and manually twisting the plastic portions of each molded item immediately after stripping and before cooling to impart a life-like varied curved appearance to each item.

3. In the method of manufacturing multi-colored artificial plastic foliage in an aluminum sheet mold having a plurality of female recesses defining a leaf pattern including a stem recess extending to the edge of the aluminum sheet, speckling the mold recess with a contrasting colored uncured plastic by daubing with a bristled brush, heating the mold after speckling to cure the speckled material, permitting the mold to cool, extruding liquid uncured plastic into the mold female recess from a nozzle, said nozzle being formed from a material softer than the aluminum mold to prevent scratching, the plastic being applied in a continuous band around the border of the mold and in a central deposit in the middle of the mold, thereafter brushing the plastic into an even pattern covering the female recesses of the mold including the stem portion, pre-heating fibre wrapped stems to drive substantially all of the moisture from the fibre portion, thereafter laying the stem along the long axis of the female recess in the uncured plastic so that the stem extends to a point adjacent one end of the leaf beyond the stem recess at its other end, heating the plastic to its curing temperature in a conveyor type oven, stripping the molded products from the mold immediately after leaving the curing oven by grasping the stems, and manually twisting the plastic portions of each molded item immediately after stripping and before cooling to impart a life-like varied curved appearance to each item.

References Cited in the file of this patent

UNITED STATES PATENTS

| | | |
|---|---|---|
| Re. 13,988 | Eggers | Sept. 28, 1915 |
| 719,632 | Akeley | Feb. 3, 1903 |
| 1,817,339 | Barnes | Aug. 4, 1931 |
| 2,198,269 | Linzell et al. | Apr. 23, 1940 |
| 2,341,999 | Lennington | Feb. 14, 1944 |
| 2,716,828 | Adler | Sept. 6, 1955 |

OTHER REFERENCES

Baird: "P. V. C. Pastes," Brit. Plastics, April 1948, pp. 167–171, specifically p. 171.